United States Patent
Krug

(10) Patent No.: US 9,319,719 B2
(45) Date of Patent: Apr. 19, 2016

(54) METHOD FOR PROCESSING VIDEO AND/OR AUDIO SIGNALS

(71) Applicant: Scalable Video Systems GMBH, Weiterstadt (DE)

(72) Inventor: Alfred Krug, Kirchzell (DE)

( * ) Notice: Subject to any disclaimer, the term of this patent is extended or adjusted under 35 U.S.C. 154(b) by 0 days.

(21) Appl. No.: 14/414,943

(22) PCT Filed: Jul. 1, 2013

(86) PCT No.: PCT/EP2013/063872
§ 371 (c)(1),
(2) Date: Jan. 15, 2015

(87) PCT Pub. No.: WO2014/012782
PCT Pub. Date: Jan. 23, 2014

(65) Prior Publication Data
US 2015/0201224 A1    Jul. 16, 2015

(30) Foreign Application Priority Data

Jul. 19, 2012   (EP) .................................. 12177198

(51) Int. Cl.
*H04N 19/15* (2014.01)
*H04N 21/2343* (2011.01)
(Continued)

(52) U.S. Cl.
CPC ........... *H04N 21/2343* (2013.01); *H04N 19/15* (2014.11); *H04N 19/164* (2014.11); *H04N 19/179* (2014.11); *H04N 19/115* (2014.11); *H04N 19/149* (2014.11)

(58) Field of Classification Search
CPC .................... H04N 21/234318; H04N 21/235; H04N 21/435; H04N 19/179; H04N 19/164; H04N 19/15; G11B 27/34; G11B 27/105
See application file for complete search history.

(56) References Cited

U.S. PATENT DOCUMENTS 5,577,191 A * 11/1996 Bonomi ............... G11B 27/034
345/502
6,377,309 B1 * 4/2002 Ito ................... H04N 21/234318
348/554

(Continued)

FOREIGN PATENT DOCUMENTS

DE   10336214 A1   3/2004
EP    1217547 A2   6/2002

(Continued)

OTHER PUBLICATIONS

R. Boutaba, N. Ren, et al., "Distributed Video Production: Tasks, Architecture and QoS Provisioning", Multimedia Tools and Applications, 2002.

(Continued)

*Primary Examiner* — Sath V Perungavoor
*Assistant Examiner* — Howard D Brown, Jr.
(74) *Attorney, Agent, or Firm* — Meagher Emanuel Laks Goldberg & Liao, LLP

(57) ABSTRACT

A method for processing video and/or audio signals utilizing a processing component which is communicatively connected with a source component having a compression stage for compressing video and/or audio signals is suggested. The method comprises the steps of receiving uncompressed video and/or audio signals as source signals at the source component from one or a plurality of sources; compressing the video and/or audio signals with a selectable compression factor; transmitting the compressed video and/or audio signals to the processing component; processing the compressed video/audio signals in the processing component to produce at least one production output signal. In addition to that a system for processing video and/or audio signals is proposed. The system comprises a source component, a routing component and a processing component. The source component transmits all received source signals through the routing component to the processing component. The processing component is adapted to determine a source signal as being important and to send a request to the source component requesting the transmission of the determined source signal as high quality signal.

8 Claims, 3 Drawing Sheets

(51) Int. Cl.
*H04N 19/164* (2014.01)
*H04N 19/179* (2014.01)
*H04N 7/26* (2006.01)
*H04N 19/149* (2014.01)
*H04N 19/115* (2014.01)

(56) References Cited

U.S. PATENT DOCUMENTS

| | | | |
|---|---|---|---|
| 7,089,577 B1* | 8/2006 | Rakib | H04N 7/17336 348/E5.008 |
| 7,352,953 B1* | 4/2008 | Hogan | G11B 20/1251 386/283 |
| 8,537,838 B2 | 9/2013 | Patel et al. | |
| 8,743,292 B2 | 6/2014 | Atherton et al. | |
| 2004/0150751 A1 | 8/2004 | Phillips et al. | |
| 2006/0282874 A1* | 12/2006 | Ito | H04N 5/4401 725/139 |
| 2009/0238263 A1 | 9/2009 | Jaggi et al. | |
| 2010/0118164 A1 | 5/2010 | Fujita et al. | |
| 2010/0149985 A1 | 6/2010 | Rousseau et al. | |
| 2010/0166062 A1* | 7/2010 | Perlman | A63F 13/12 375/240.05 |
| 2010/0246666 A1* | 9/2010 | Miazzo | G11B 27/034 375/240.01 |
| 2011/0090897 A1* | 4/2011 | Johnson | H04H 20/30 370/350 |
| 2012/0300016 A1* | 11/2012 | Li | H04N 7/152 348/14.09 |
| 2013/0111312 A1* | 5/2013 | Karmarkar | H04L 63/104 715/201 |

FOREIGN PATENT DOCUMENTS

| | | |
|---|---|---|
| EP | 1936908 A1 | 6/2008 |
| EP | 2077647 A1 | 7/2009 |
| EP | 2107708 A1 | 10/2009 |
| EP | 2683155 A1 | 1/2014 |
| JP | 2002149316 A | 5/2002 |
| WO | 2005122025 A2 | 12/2005 |
| WO | 2009014716 A1 | 1/2009 |

OTHER PUBLICATIONS

M. Kaul, M. Wasserschaff, S. Gibbs, C. Breiteneder, and D. Steinberg, "Studio on Demand by Distributed Video Production over ATM", International Broadcasting Convention, 1996.

Hideki Sumiyoshi, Yuichi Mochizuki et al., "Network-based Cooperative TV Program Production System", IEEE Transactions on Broadcasting, 42, 1996.

Martin Nicholson, "Feasibility of building an all-IP network—the BBC NGN project", Internet Protocol, 2012.

Machine Translations of Abstract, Claims, and Description of DE10336214 listed above.

Machine Translations of Abstract, Claims, and Description of JP2002149316 listed above.

\* cited by examiner

METHOD FOR PROCESSING VIDEO AND/OR AUDIO SIGNALS

BACKGROUND

The invention is related to a method for processing video and/or audio signals. In particular the invention is related to a method according to claim 1 for processing video and/or audio signals and to a system according to claim 8.

Live video productions such as TV productions are realized today using vision mixers. Vision mixers are commercially available e.g. from the companies Grass Valley, Sony, Snell & Wilcox, and Ross.

A vision mixer (also called video switcher, video mixer, production switcher or simply mixer) is a device used to select between different video input signals to generate a video output signal. Besides switching directly between two input signals the vision mixer can also generate different kinds of transitions. Direct switching means that frame N is from a first input signal and frame N+1 is from a second input signal. Transitions between two input signals include simple dissolves and various kinds of effect transitions. Most mixers are equipped with keyers and matte generators to perform keying operations and to generate background signals which are also called mattes.

The vision mixer also performs the routing and switching of audio signals accompanying the video signals. However, since the processing of video signals is more complex than the processing of audio signals the present patent application is focused on the video signal. It is to be understood that in the context of the present patent application the processing of the video signal also implies a corresponding processing of an accompanying audio signal. Only for the sake of better intelligibility of the description of the present invention audio signals are not always mentioned in addition to the video signals. In the following also the term "channel" will be used for video signals originating from a specific source.

In order to enable the multiple functionalities of vision mixers they consist of a huge amount of hardware components to process the video signals. The processing hardware components are located in one housing and are connected with local bus solutions in order to control all video processing hardware in real-time to meet the fast control requirements of live productions. In today's vision mixers there is a latency of approximately 40 ms between the moment when a user pushes a button until the associated function is executed. A latency of 40 ms is still called "real-time" processing.

The vision mixer comprises a central mixing electronic, several input channels and at least one output channel, a control unit and a user interface. Such kind of vision mixer is described for example in DE 103 36 214 A1.

The mixing electronic is provided with up to 100 or even more video input signals at the same time. The input signals are live video signals from cameras, recorded video clips from a server such as archived material, slow-motion clips from dedicated slow-motion servers, synthetic images, animations and alphanumeric symbols from graphic generators.

Devices external to the vision mixer are also controlled from the vision mixer by the user.

In the broadcast industries it is common use that video is transferred and ported in full video bandwidth at Serial Digital Interface (SDI) and also processed (mixed or modified) in full bandwidth and in real-time. That means that the video is processed frame by frame as it comes in periodically. The big advantage of this environment is that the processed video always shows the highest quality at all processed outputs with a minimum of signal and control latency.

Today, video distribution technology undergoes a change. Video is distributed more and more in data streams based on data networks based on conventional IT technologies instead of using SDI cable arrays. Data networks based on conventional IT technologies will be called in the following also briefly data networks. The term data network shall not include SDI cable arrays. Using IT technology for video streaming is standard for consumer products or other applications on the consumer level which are lower quality applications. Video streaming over data networks has already started to be introduced in broadcast like industries. However, today it is in general not possible to port the full bandwidth that is available in SDI broadcast studios to a data network. The bandwidth is not yet available and even the available insufficient bandwidth is very expensive to rent e.g. for local and wide area networks (LAN, WAN). Today the problem is solved by making compromises. The compromise includes distributing video channels in compressed quality and in addition to that by keeping the number of distributed channels to a minimum especially when high quality transfer is requested. Due to this bottleneck it is simply not realistic to provide a broadcast vision mixer with 50 to 100 uncompressed high definition (HD) video streams at the same time. This is the reason why first attempts to move broadcast applications to IT data networks is very limited at present. On a 10 Gbit network one can only transport at maximum 3 full HD 1080p50 video signals simultaneously. Alternatively, the video is transferred as a compressed signal at a compression factor up to 25 compromising the quality of the final processed video output. There is always a trade-off between one situation where all sources are transferred in a compressed format and another situation where only a few channels are transferred in an uncompressed format. The compromise between the before mentioned extreme situations is somewhere between consumer and broadcast video output quality depending on the application. The more sources are requested the higher is the selected compression to cope with bandwidth limitations. In an environment with limited bandwidth the number of channels that can be transferred decreases if the requested quality of the channels increases. Quality means in this context a higher data rate of the transferred channel.

In the following the term "high quality" and "high quality signal" will be used for uncompressed signals and signals compressed with a low compression factor such as e.g. 4. High quality is a relative property of a signal relative to other signals which are compressed with a high compression factor such as e.g. 25, 30 or even 50.

WO 2009/014716 A1 discloses a full duplex network-based system and a corresponding method. The known duplex communications system provides full duplex audio and video communications between a first location and a second location. At the first location there is a reporter and a camera person and at the second location a broadcast studio. The audio and video data are transmitted in a compressed format via a wireless network between the first and second location. Quality of service statistical information is used to enhance or optimize the quality of the signal being transmitted based on varying performance measurements.

WO 2005/122 025 A2 describes a personal media broadcasting system that enables video distribution over a computer network and allows a user to view and control media sources over a computer network from a remote location. The central component is a personal broadcaster which is connected by a local area network with local clients and by a remote network with remote clients on the one hand and with audio/video source devices on the other hand. The personal broadcaster compresses audio and video before converting it into network packets for transmission over the local network and the remote network. The known system optimizes the audio and video compression based on available network bandwidth and capabilities of client devices to cope with variable data throughput to local and remote clients.

SUMMARY OF THE INVENTION

Taking this as a starting point there is a need to improve the processing of video and/or audio signals in the sense to alleviate limitations inherent with using conventional IT technologies for distributing video and/or audio data streams.

According to a first aspect the present invention suggests a method for processing video and/or audio signals utilizing a processing component which is communicatively connected via a data network with a source component having a compression stage for compressing video and/or audio signals. The method comprises the steps of receiving uncompressed video and/or audio signals as source signals at the source component from one or a plurality of sources;

compressing the video and/or audio signals with a selectable compression factor;

transmitting the compressed video and/or audio signals to the processing component;

processing the compressed video and/or audio signals in the processing component to produce at least one production output signal;

wherein the method is characterized by determining a specific source signal as being important for the production signal because of the content of the specific source signal by a predefined algorithm or by manual user input; and sending the source signal determined in the previous step as compressed signal and as high quality signal at the same time to the processing component.

It has been found particularly useful if the method further comprises the step of replacing the compressed video and/or audio signal determined as being important for the production output signal by the high quality in the production output signal as soon as the high quality signal is available.

In a further development the method comprises the step of sending a request to the source component to select a different compression factor for the determined specific source signal and to provide a high quality signal.

The biggest positive influence on the quality can be achieved if the method further comprises the step of compressing the determined source signal with a compression factor of 1 to provide a high quality signal. That means that the determined source signal is provided in uncompressed format.

In an advantageous embodiment the method further comprises the step of routing the compressed videos/and or audio signal through the data network wherein the data network comprises a local data bus, a local area network LAN, and/or a wide area network WAN.

A video production made according to the inventive method can be simplified if the method further comprises the step of determining the source signal forming a background signal by default as important signal. In an alternative embodiment the method comprises the step of determining the source signal forming a foreground signal by default as important signal.

According to a second aspect the present invention suggests a system for processing video and/or audio signals, wherein the system comprises a source component, a routing component and a processing component. The source component transmits all received source signals as compressed video and/or audio signals through the routing component to the processing component via a data network. The processing component is adapted to determine a source signal as being important because of its content and to send a request to the source component requesting the transmission of the determined source signal as compressed signal and as high quality signal at the same time to the processing component.

According to an advantageous embodiment the routing component is a logical data link transmitting signals in packetized format.

The system according to the present invention achieves the advantage that any one of all available source signals can be delivered to the processing means as uncompressed signal to generate a high quality production output.

This improvement is available with out missing the key features of the conventional uncompressed SDI-based routing video processing units like real-time processing, real-time control and minimum signal latency. All this is available on the random processing access to any of the sources.

BRIEF DESCRIPTION OF THE DRAWINGS

Exemplary embodiments of the invention are illustrated in the drawings and are explained in more detail in the following description.

DETAILED DESCRIPTION OF AN EMBODIMENT OF THE PRESENT INVENTION

Figure 1:
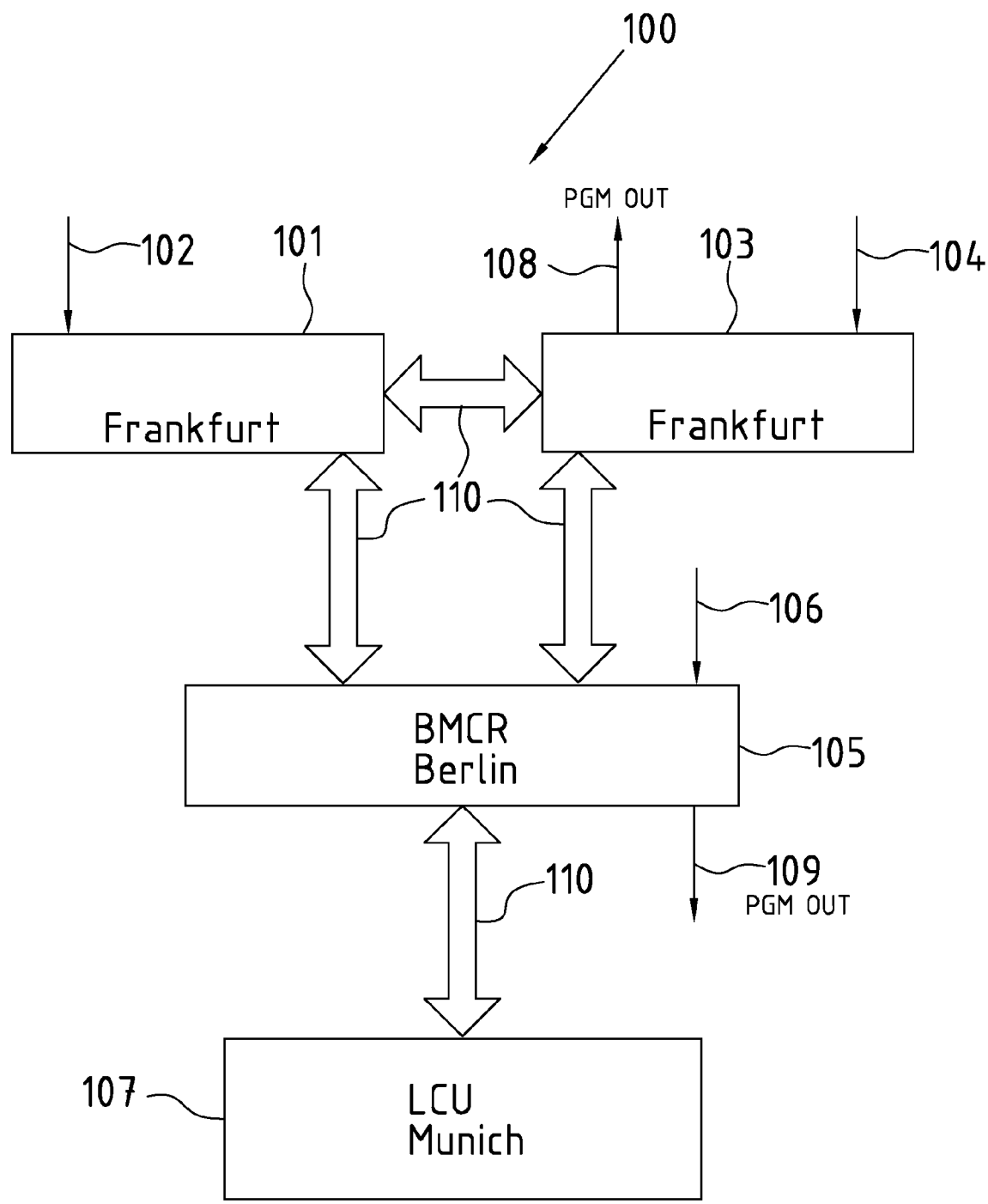
FIG. 1 shows a schematic block diagram of a system for video processing.

FIG. 1 shows a schematic block diagram of the architecture of a system for processing video and/or audio signals. The architecture of the system allows building the hardware platform on standardized IT technology components such as servers, graphical processing units (GPU) and high-speed data links. Typically, these standardized IT components are less costly than dedicated broadcast equipment components. Besides the cost advantage the system shown in FIG. 1 benefits automatically from technological progress in the area of the above-mentioned IT components. In the system video processing hardware is split into smaller and flexible video processing units and combines dedicated control, video and audio interconnections into one logical data link between the individual processing units. The data links are designed such that they have a reliable and constant time relation. The individual processing units work independently as fast as possible to achieve or even exceed real-time processing behavior. As mentioned before, real-time behavior corresponds to approximately 40 ms signal latency. The production system is built out of those individual production units which are connected with data links. The system ensures that overall production real-time behavior with simultaneous processing is achieved and generates a consistent production signal PGM-OUT. For this purpose the known individual delays for the transfer of control, video and audio signals between the different production units are considered. The data links are typically based on a reliable bidirectional high-speed data connection such as LAN or WAN. This general concept is described in greater detail in the following.

In the video processing system the video processing hardware is organized in processing units 101, 103, 105, and 107 according to the geographical distribution of a production i.e. according to the geographical distribution of the resources enabling the production as it is shown schematically in FIG. 1. The technical core of each processing unit is a server, one or several graphical processing units (GPUs) and high-speed data link connections operated by a processing application framework and dedicated algorithms. The processing application framework and the algorithms are realized in software. The algorithms are adaptable and extendable to also realize further functionalities going beyond the functionalities of conventional vision mixers. The video signals are processed by GPUs in commercially available graphic cards. Hence, conventional video processing by dedicated hardware is replaced by software running on standardized IT components. All the processing capabilities of the GPUs are available and enable new video effects. However, this is not subject of the present invention.

The operator controls the whole production as if it would be at one single production site in a single production unit next to the control room. The entire production process is moved from dedicated video/audio and control routing to common data links. The individual wiring hardware such as SDI connections is replaced by standardized data networks. The routing of all signals in the data networks is bidirectional and the production output and monitoring signals like dedicated multi-view outputs can be routed to any production unit which is connected in the network without extra cabling expenses.

High-speed data networks are more and more available not only in video production sites such as film or TV studios but also in wide area distribution networks, e.g. multiple of 10 G Ethernet or Infiniband.

In studios, professional video networking means that the video content is transferred uncompressed. For HDTV formats 1080i/720p data rates of 1.5 Gbit/s are resulting in studio environment where uncompressed audio and video data are used. For HD format 1080p a net data rate of even 3.0 Gbit/s is resulting.

Referring back to FIG. 1 every block represents one of the distributed processing units belonging to the system which is referred to in its entirety with reference number 100. In the exemplary embodiment shown in FIG. 1 processing unit 101 is located in a football stadium in Frankfurt. Processing unit 101 receives as local sources 102 camera signals from the Stadium, slow-motion video from a local slow-motion server and eventually audio and video signals from an interview taking place locally. Processing unit 103 is also located in Frankfurt but not necessarily in the same place as processing unit 101. Processing unit 103 receives camera signals as local sources 104 from a live moderator and an interview room. Processing unit 105 is located in Berlin and represents the main processing room providing additional processing power for the ongoing production as well as access to archives and servers where for example advertisement clips are stored. The archives and the servers are indicated as local sources 106. The local sources 102, 104, and 106 provide the video and/or audio signals as SDI or streaming data. Finally, there is a processing unit 107 which represents the live control unit (LCU) located in Munich from where the live production is controlled and monitored. The production result is leaving processing units 103 and 105 as video and audio output signals PGM-OUT 108 and 109 for being broadcasted. The processing units 101, 103, 105, and 107 are interconnected with each other with reliable bidirectional high-speed data links 110 as shown in FIG. 1. The data links 110 enable communication between the processing units 101, 103, 105, and 107 and provide constant and known signal delays between the production units. It is noted that the high-speed data links 110 represent logical data links which are independent of a specific hardware realization. For example, the data links 110 can be realized with a set of several cables. In the situation shown in FIG. 1 the data links 110 are an Internet protocol (IP) wide area network (WAN). In a WAN special measures have to be taken to make sure that the data packages are received in the same sequence as they have been sent over the network to meet the requirements of video processing. Appropriate measures can be taken on the protocol and/or hardware level of the network.

The system described in connection with FIG. 1 is also described in the co-pending European patent application EP12175474.1.

Figure 2:
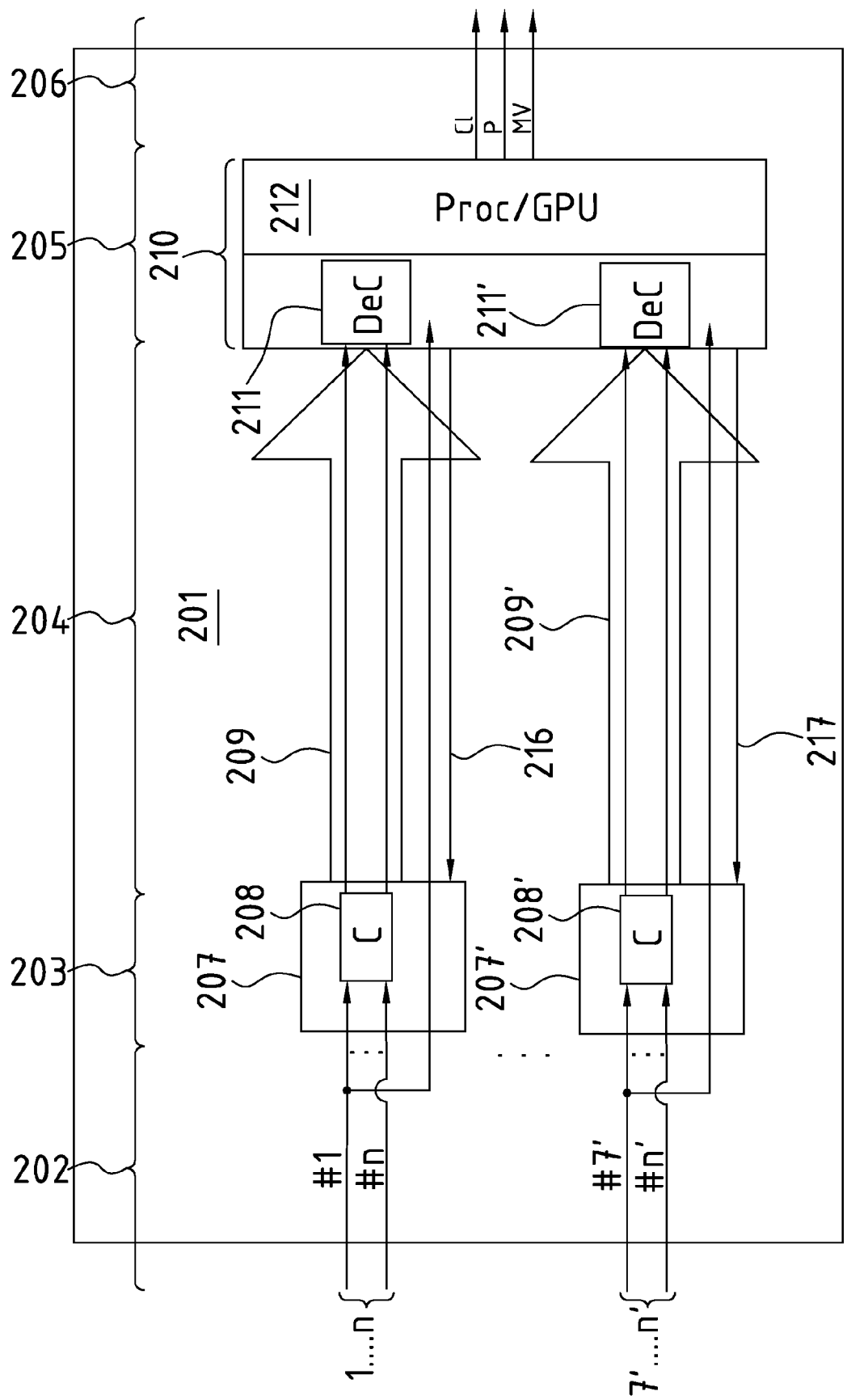
FIG. 2 shows a schematic block diagram of a processing means being part in the system for video processing of FIG. 1.

FIG. 2 shows a schematic block diagram of the present invention. The concept of the invention is applicable on different levels of the processing system 100 laid out in FIG. 1, i.e. the invention is applicable within a device of the production system, within a single production site provided with a plurality of devices connected by LAN, and finally in the processing system as a whole comprising multiple sites connected by a WAN. This will be explained in more detail in the following beginning with the lowest level, namely when the invention is used in a single device.

The interpretation of the block diagram in FIG. 2 changes if the invention is applied to different levels of the processing system 100. The entire block diagram will therefore be named with the general term "processing means" to differentiate it over the processing units and the processing system shown in FIG. 1.

At first of the invention will be explained when it is used on the level of the processing unit 103 corresponding to the device level. Hence, the processing means 201 shown in FIG. 2 corresponds to processing unit 103. The processing means 201 is structured into five sections. The five sections are source section 202, source component section 203, routing and transmission component section 204, processing component section 205, and output section 206.

A source component 207 receives a first set of high quality source signals #1 to #n. The source signals are provided e.g. by cameras, clip servers, video effect generators, and alpha numeric character generators. The source component 207 also comprises a video compression stage 208 for compressing all received source signals. The compression factor of compression stage 208 is for example 25 enabling to transfer 25 compressed video signals with a data rate of 3 Gbit/s. As it is shown, all source signals are compressed in source component 207 by compression stage 208 before they are transmitted by a routing component 209. In the present embodiment the routing component 209 is an internal bus of the processing device (processing unit). The routing component 209 has a maximum data rate of 10 Gbit/s. Thus, the data link 209 has an available capacity to transfer in addition to the 25 compressed source signals two uncompressed high definition source signals at the same time. Consequently, the source component is capable to transfer up to two uncompressed source signals upon request. We will come back to this point further below. The compressed video signals are received on the level of the processing component section 205 by processing component 210. In the processing component 210 there is a decompression stage 211 for decompressing the received compressed video signals. The decompressed video signals are processed in a graphical processing unit GPU 212 according to user commands to generate output signals. In the present embodiment the output signals comprise a program signal P, a clean program signal Cl, and a multi-view signal MV. The program and the clean outputs are the outputs with the high production quality request to their main signal(s) source which is by default the background (BGD) source. The multi-view output is for pure monitoring and control purposes for the video production.

In the embodiment shown in FIG. 2 there is a second set of source signals #1' to #n' connected to a second source component 207' having a compression stage 208'. Today's vision mixers have up to 100 high quality video inputs as source signals available to produce the program signal P, the clean program signal Cl, and the multi-view signal MV. The compressed video signals are routed from the compression stage 208' by a routing component 209' to a decompression stage 211'. The decompressed output video signals of the compression stage 211' are finally processed in the GPU 212 like the signals originating from the first set of source video signals. Also the multi-view output MV contains all source signals from the first and the second set of source signals #1 to #n and #1' to #n'. The multi-view output MV enables the display of all source signals on a monitor wall. Consequently, also the source signals from the second set of input video signals can be used to generate the program output signals.

Other embodiments of the present invention comprise only one set of source video signals or more than two sets of source video signals.

All embodiments have in common that all source signals are available at all times as compressed signal. All source signals are displayable on a monitor wall providing a complete overview for a production director. Both routing components 209 and 209' still have available bandwidth for 2 uncompressed source signals. Therefore the production director has the option to request at any time the transmission of up to two uncompressed source signals from the source components 207 and 207'. In the following the term "high quality signal" will be used to include both uncompressed signals and signals compressed with a low compression factor such as e.g. 4. The switching from a compressed signal to a high quality signal takes place within a few frames, i.e. in real time. On the example of a live production from a soccer stadium the method according to the present invention will be further illustrated. The request for a high quality signal is to be understood that always the maximum available quality of a signal is requested.

In a soccer stadium the source signals are e.g. the camera signals of 30 cameras distributed in the Stadium. All camera signals are contained in the multi-view output signal MV and displayable on a monitor wall. From these signals a production director selects one camera signal as program signal P for the broadcast e.g. the source signal #1 of the first set of source signals. Upon the command of the production director to select source signal #1 the processing component 210 sends a request command 216 to the source component 207 to transfer the source signal #1 as a high quality signal. In response to the request command 216 the source component 207 transfers the source signal #1 as high quality signal. The high quality version of source signal #1 is an uncompressed signal or a compressed signal with a reduced compression factor. The source signal #1 is transferred as compressed and at the same time as uncompressed signal in parallel. Similarly, the processing stage 210 sends a request command 217 to source component 207' requesting the delivery of source signal #7' of the second set of source signal as a high quality signal. The high quality version of source signal #7' is an uncompressed signal or a compressed signal with a reduced compression factor.

Since the present embodiment is on the device level the routing components 209, 209' are device internal data buses.

When the invention is applied on the level of a local system, e.g. a system comprising two different processing units then the routing components 209, 209' are realized as a local area network (LAN) data connection. In such a configuration the source component 207 and the processing component 210 belong to different processing units located at a single production site.

It is also possible to apply the present invention on the level of the processing system shown in FIG. 1. In this system the processing units 101, 103, 105 are connected by a wide area network (WAN). Likewise as in the previous configuration the source component 207 and the processing component 210 belong to different processing units.

Finally, it becomes evident that the present invention can be applied on the three different levels of the processing system 100 at the same time in any possible configuration. In such a situation the routing components 209 and 209' involve data transfer via a device internal data bus, a LAN and a WAN as a function of which source component needs to be connected with which processing component.

In the embodiment described so far it was the decision of the production director which one of the input signals ought to be transferred as high quality signal. This is a user decision the execution of which is triggered manually.

Alternative ways to select the input signal to be transferred in a high quality format will be described in the following.

The processing unit receives all necessary sources in the compressed format and executes all processing by uncompressing these sources to the native processing video standard. The processing unit "knows" all sources used to compose the output signal as well as their importance for the whole composition. Therefore, in an embodiment of the present invention the processing unit determines which of the used sources is significant for the quality of the actual program output. Basis for the determination are simple rules stored in the processing unit. In most cases the signal used to build the background of a current scene composition is most important. Every time the processing unit detects a new source to become most important for the program, it requests this source from the source component in a high quality or in the maximum available quality. The maximum available quality means that some source signals are stored on a server only as compressed signals. In such cases the original uncompressed signal is no more available. The high quality stream is transmitted as a second stream in parallel to the compressed version stream or in a dynamic reduction of the compression in the current compressed stream. As soon as the high-quality (e.g. uncompressed) stream(s) become(s) available, the processing component prefers the available high quality stream(s) by replacing the lower quality compressed stream(s) for the current processing. The dynamic high quality on the request can be achieved within a few frames delay after a scene change so that for the viewer this is hardly noticeable.

The advantage of the invention is that the processing unit by default or by configuration determines which source signals are important for obtaining a high quality perception of the viewer of the program outputs P and Cl. The processing component 210 requests those source signals to be transferred in the highest quality available. This mechanism is scalable depending on the systems environment. If the available environment bandwidth grows more sources that contribute to the video composition can be requested and provided in high routing quality.

Video content that appears on the reduced size on any processing components video output normally do not request high-quality video sources. The same is true for graphic content that normally covers parts of background signals. Since most video sources are applied that way to processing outputs the overall quality of the system using the present invention is close to the 100% high quality processing of conventional video processing systems.

In a typical broadcast video production one source of the scene composition is of high quality importance to the viewer. This is typically the background signal e.g. in news, sports, live shows. If a second source in the composition is also important it might be a chroma key source to put the speaker in front of the background. All other sources additionally participate in this scene are not relevant for the quality perception of the viewer. These other sources are typically live video or graphics which are reduced in size for which a reduced transmission quality is acceptable. For the duration while the background signal is changed in the processed scene e.g. by using a dynamic transition effect the viewer will not notice the reduced quality within this short time window which is typically only a few frames long.

The present invention is also applicable for video on demand. An example could be IT based video streaming. If the video over IP client changes the size of its viewing window the streaming quality could be dynamically adapted on client's request to optimize transmission bandwidth according to the client's need.

Figure 3:
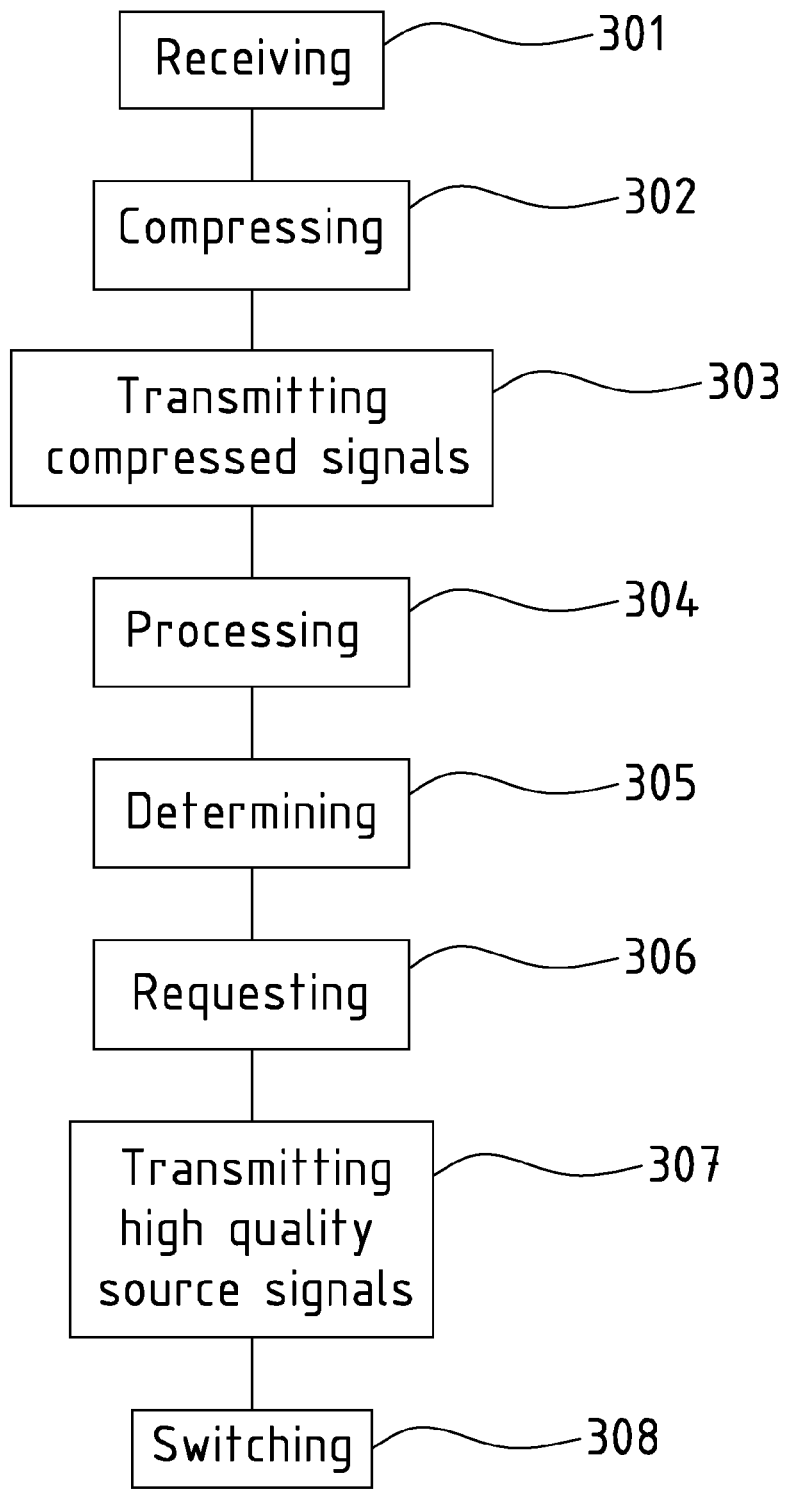
FIG. 3 exhibits a flow diagram of the method for video processing according to the present invention.

FIG. 3 illustrates in a comprehensive way the inventive method of processing video and/or audio signals. In step 301 the source component receives high quality source signals. In step 302 the compression units 208 and 208' compress the received source signals with a selectable compression factor. In step 303 the routing components 209 and 209' transmit the compressed video and/or audio signals to the processing component. In step 304 the processing component processes the compressed video/audio signals in the processing unit to produce at least one production output signal. In step 305 it is determined which source signal is important for the quality perception of a viewer of the production output signal. Then the processing component sends in step 306 a request command 216 and 217, respectively, to the source components 207 and 207', respectively, requesting the source signal which has been determined as being important as high quality signal. In step 307 the source components transmit the requested source signals as high quality signals. There are two options for the delivery of the high quality signals. According to a first option the compression factor of the important source signals is reduced. According to a second option the important source signals are provided as uncompressed signals. In case of the second option the processing component 210 switches in step 308 from the originally received compressed signal to the high quality version of the same source signal. In this way the compressed source signal is replaced by its high quality version. In a specific embodiment of the invention the replacement is performed as a so called "soft cut" making a transition from the compressed signal to the high quality signal within 2 to 3 or more frames. If the transition is made by a soft cut the replacement of the signals is hardly noticeable in the program output.

In general terms it can be said that the use of the present invention is advantageous in every device or system in which the sum of bandwidths of all input signals which can be made available at the outputs of the device or system is bigger than the bandwidths of signals which are actually made available at the outputs at any given point in time.

LIST OF REFERENCE NUMBERS

100 processing system
101 processing unit
102 external sources
103 processing unit
104 external sources
105 processing unit
106 local sources
107 processing unit
108, 109 output signals
110 data links
201 processing means
202 source section
203 source component section
204 routing component section
205 processing component section
206 output section
207 source component
208 compression stage
209 routing component
210 processing component
211 decompression stage
212 graphic processing unit
213 program output signal
214 clean program output signal
215 multiview output signal
216 request signal
217 request signal
301 . . . 308 method steps

The invention claimed is:

1. Method for processing at least one of video and audio signals utilizing a processing component which is communicatively connected via a data network with a source component having a compression stage for compressing the at least one of video and audio signals, wherein the method comprises receiving at least one of uncompressed video and audio signals as source signals at the source component from at least one of a plurality of sources;

compressing the at least one of video and audio signals with a selectable first compression factor;

transmitting the at least one of compressed video and audio signals to the processing component;

processing the at least one of compressed video and audio signals in the processing component to produce at least one production output signal and a multi-view signal;

wherein the method further comprises determining a specific source signal as being important for the production output signal because of content of the specific source signal by one of a predefined algorithm and manual user input;

sending the source signal determined as being important for the production output signal from the source component at the same time as a high quality signal and as a compressed signal to the processing component, wherein the high quality signal is compressed with a second compression factor which is smaller than the first compression factor;

processing the high quality signal and at least one of the compressed video and audio signals in the processing component to produce the production output signal; and processing all of the compressed video and audio signals in the processing component to produce the multi-view signal.

2. Method according to claim 1, wherein the method further comprises replacing the at least one of compressed video and audio signal determined as being important for the production output signal by the high quality signal in the production output signal as soon as the high quality signal is available.

3. Method according to claim 1, wherein the method further comprises

Sending a request to the source component to send the source signal determined as being important for the production output signal as high quality signal to the processing component.

4. Method according to claim 1, wherein the method further comprises routing the at least one of compressed video and audio signals through the data network wherein the data network comprises at least one of: a local data bus, a local area network LAN, and a wide area network WAN.

5. Method according to claim 1, wherein the method further comprises determining the source signal forming a background signal by default as important signal.

6. Method according to claim 1, wherein the method further comprises determining the source signal forming a foreground signal by default as important signal.

7. System for processing at least one of video and audio signals, wherein the system comprises a source component having a compression stage, a routing component and a processing component, wherein the source component transmits all received source signals as a plurality of compressed video and audio signals with a selectable first compression factor through the routing component to the processing component via a data network, characterized in that the processing component is adapted to determine a source signal as being important for a production output signal because of its content and to send a request to the source component requesting the transmission of the determined source signal to the processing component as a compressed signal and at the same time as a high quality signal, wherein the high quality signal is compressed with a second compression factor which is smaller than the first compression factor; that the processing component processes the high quality signal and ones of the plurality of compressed video and audio signals to produce the production output signal; and that the processing component processes all of the plurality of compressed video and audio signals to produce a multi-view output signal.

8. System according to claim 7, wherein the routing component is a logical data link transmitting signals in packetized format.

\* \* \* \* \*